No. 818,593. PATENTED APR. 24, 1906.
W. C. WHITNEY.
VENDING MACHINE.
APPLICATION FILED MAR. 17, 1904. RENEWED MAY 3, 1905.

No. 818,593. PATENTED APR. 24, 1906.
W. C. WHITNEY.
VENDING MACHINE.
APPLICATION FILED MAR. 17, 1904. RENEWED MAY 3, 1905.

WITNESSES
E. J. Nottingham
G. F. Downing

INVENTOR
W. C. Whitney
By H. A. Seymour
Attorney

No. 818,593. PATENTED APR. 24, 1906.
W. C. WHITNEY.
VENDING MACHINE.
APPLICATION FILED MAR. 17, 1904. RENEWED MAY 3, 1905.

WITNESSES
INVENTOR
W. C. Whitney
By H. A. Seymour
Attorney

UNITED STATES PATENT OFFICE.

WILLIAM C. WHITNEY, OF NEWARK, NEW JERSEY, ASSIGNOR TO SILAS E. WILMORE, OF NEW YORK, N. Y.

VENDING-MACHINE.

No. 818,593.           Specification of Letters Patent.           Patented April 24, 1906.

Application filed March 17, 1904. Renewed May 3, 1905. Serial No. 258,894.

*To all whom it may concern:*

Be it known that I, WILLIAM C. WHITNEY, a resident of Newark, in the county of Essex and State of New Jersey, have invented certain new and useful Improvements in Vending-Machines; and I do hereby declare the following to be a full, clear, and exact description of the invention, such as will enable others skilled in the art to which it appertains to make and use the same.

My invention relates to an improved vending-machine, and while it is designed as an improvement upon the construction disclosed in the patent to Eugene S. Scheble, No. 732,786, July 7, 1903, it embodies a great many departures therefrom, as will fully hereinafter appear.

An object of my invention is to provide a vending-machine which it is impossible to defraud and which cannot defraud a purchaser.

A further object is to provide improved means for changing the price of goods, or, in other words, regulating the coin necessary to secure the goods contained in a certain column or receptacle.

A further object is to provide improved ejector mechanism and mounting therefor and improved coin-controlled operating mechanism therefor.

With these objects in view the invention consists in certain novel features of construction and combinations and arrangements of parts, as will be more fully hereinafter described, and pointed out in the claims.

In the accompanying drawings, Fig. 2 is a view in vertical section. Fig. 19 is a view of the star-wheel. Fig. 20 is the ejector, and Fig. 21 a view in perspective of the carton or box used with the machine.

1 represents a cylindrical casing secured within a circular flange 2 on a base-plate 3, and the upper edge of said cylinder 1 is provided in opposite sides with inclined slots 4 to receive pins 5 on a recessed ring 6 when the latter is turned slightly, and a spring-catch 7 is secured at one end and projects across a slot. This spring-catch 7 is bent or flared to permit its displacement by a pin 5 and is made with an opening to receive the pin and lock the ring 6 over the cylinder. The ring 6 has secured therein a conical glass or other transparent cover 8, to the open center of which a metal collar 9 is secured and forms a bearing for the vertical shaft 10, the lower end of this shaft having a thrust-bearing on antifriction-balls 11 in a cup 12 on base-plate 3. The extreme upper end of this shaft 10 is made with an annular recess to provide a shoulder, against which the central hub of a knob or handhold 13 is secured by means of a screw 14, screwed into the upper end of the shaft 10 and having its head bearing against knob 13, and to compel the rotation of the shaft when the knob is turned the shaft at its annular shoulder is made with lugs 15 to enter corresponding notches in the hub of knob 13. This shaft 10 is further supported against lateral bending or displacement by a cross-bar 16, having a central bearing to receive the shaft and secured at its ends upon brackets 17, affixed to the interior of cylinder 1 by means of screws 18.

Figure 18:
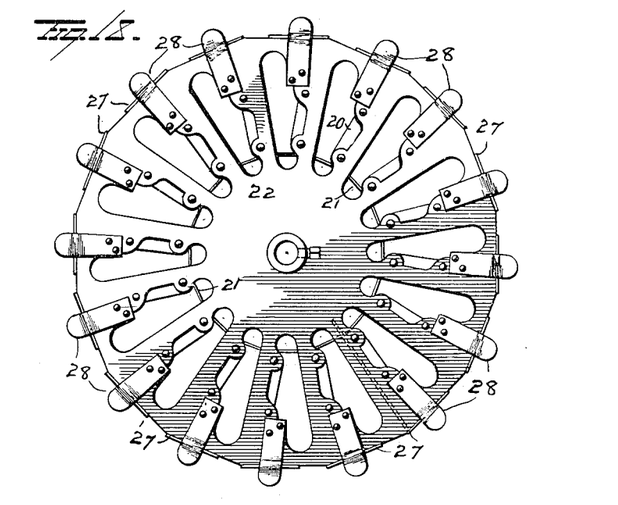
Fig. 18 is a top view of the storage-frame.
Figure 21:
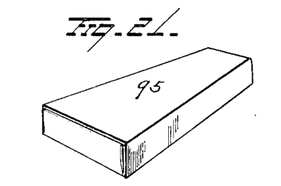

On shaft 10 my improved storage-frame 19 is secured and holds the cartons or boxes containing the goods to be vended. This frame 19 comprises at its top a circular open-work plate or casting 22, secured centrally upon shaft 10, and to which the bent or flanged upper ends of radial partitions 20 are secured by screws or rivets, as shown. These radial partitions also pass through a central cylinder 21, secured to plate 22 and has secured therein at its lower end a hub 23, secured to shaft 10 by a set-screw. Flanged plates 24 are secured to the opposite sides of the partitions 20 at their lower ends, forming bottom supports for the cartons or boxes, and are spaced apart to provide a passage-way between them for the ejector 25, which will be hereinafter explained. Cross-plates 26 connect the partitions 20 near their bottom at their outer edge, and shutters 27 are hinged to these plates 26 and are fastened in an upright position by spring-clips 28 on plate 22 to partially inclose the cartons or boxes, but are sufficiently narrower than the compartments or columns to permit a view of the same and to provide clearance for protruding fingers 29 on weights 30, the function of which will be hereinafter explained. The plates 26 are spaced sufficiently from bottom plates 24 to allow a single carton or box to be forced out, and the central cylinder 21 terminates above bottom plates 24 far enough so as not to interfere with the movement of the ejector in forcing out the bottom carton.

The central cylinder 21 is in reality in a horizontal section, a polygon having a flat side at the inner side of each column or compartment, thus giving to the compartment in cross-section a general keystone shape to receive cartons of like shape and utilize to the greatest extent the space of the frame, and this is an improvement over all machines of this character heretofore known.

Beneath the transparent cover 8 a conical display-tray 31 is secured by means of a set-screw 32, passed through a central hub 33 on said tray and against shaft 10 to receive the tray thereon. This display-tray is provided with a series of radial display-compartments for the goods vended, a compartment being located directly above each and every column of the storage-frame 19, so as to display the goods contained in the cartons of said compartment, and which will be secured if this compartment is turned to the front and the proper coin dropped into the machine.

Should a column or compartment become emptied, the weight 30 of such column will of course rest on bottom plates 24, when the outwardly-projecting finger 29 thereon will be in a horizontal plane to engage a cam-plate 34. This cam-plate 34 is hinged at one side to the inner wall of what I term the "front casing" 35, in which is contained the coin-controlled mechanism to be hereinafter explained. The plate 34 has cams at both ends, so that it will be engaged and depressed by a weight-finger 29 if the storage-frame is turned in either direction, and to the free end of this cam-plate 34 a rod 36 is pivotally connected and passes up through front casing 35 and is secured to one side of the central pivotal support of a disk 37, upon which the word "Empty" or other like information is printed. When the cam-plate 34 is depressed by a weight-finger 29, the rod 36 will be pulled down to turn disk 37 to a position to display the word "Empty" at an opening or window in front casing 35, and thus advise the purchaser that this column is empty. When the storage-frame is turned to free the cam-plate 34, a weight 38 on disk 37 will cause the return of the parts to their former positions and leave a blank at the opening or window, or suitable printing may be exposed to indicate that goods are in the column in front.

The front casing 35 is provided with coin-slots labeled, respectively, "1 cent," "5 cents," and "10 cents," so that the purchaser knows in which to insert his coin. Communicating with these slots are grooved coin-chutes 39 of just sufficient width to accommodate the proper coin—as, for instance, should a one-cent coin or ten-cent coin be placed in the five-cent chute it will fall through the open bottom down into a carton delivery-pocket 40, formed in the bottom of front casing 35 in convenient reach of the purchaser. Beneath the inner ends of these coin-chutes 39 a coin-guide 41 is located, over which, unless deflected, the coins would jump into a hopper 42, which conveys them to the delivery-pocket 40, and to compel the passage of the proper coin into guide 41 I provide a deflector 43, which is in the form of a bell-crank lever, pivoted at its angle and normally held behind the one-cent chute by a spring to guide a one-cent coin into the guide, and suitable stop-pins 43$^a$ are provided to limit its movement in both directions. To the shorter member of the deflector 43 a depending rod 44 is secured and is connected at its lower end to one end of an approximately-horizontal lever 45, pivoted between its ends on a pin or lug made integral with a bracket 46, secured to base-plate 3. The inner end of lever 45 is provided with a double cam-plate 47 in the path of screws 48, projecting down through a star-wheel 49, secured on shaft 10 by a set-screw. This star-wheel 49 has a point or projection for each and every compartment, and each point of the star has a screw-threaded opening to receive a screw 48, and while I have shown screws in all the points it is evident that no screws are needed for the one-cent columns, as the deflector is normally behind the one-cent chute. The screws 48 for the ten-cent columns are the longest and depress the cam-plate 47 the greatest distance, as the deflector must be thrown to its extreme position behind the ten-cent chute. The screws for the five-cent columns are shorter than those for the ten-cent goods and move the deflector behind the five-cent chute. Hence it will be seen that when the storage-frame is turned to bring a column to the front the screws automatically bring the deflector behind the proper chute, and coins placed in the wrong chutes will jump over the guide 41 into hopper 42 and into the delivery-pocket. It will thus be seen that the value of the goods in the several columns, or, in other words, the price necessary to secure the goods in the various columns, can be changed at will by simply shifting the screws—that is to say, changing short screws for longer ones—and vice versa.

To outwardly-projecting lugs 50 on the front plate of coin-guide 41 the turned-up ends of a plate 51 are pivoted by screws 52, and this plate has at its upper edge three coin-deflectors 53 normally in position to direct a coin into guide 41; but a rod 54 connects an arm 55 on one end of this plate with the rod 36, so that when said rod is pulled down by the finger-weight, as above explained, the plate 51 will be swung on its pivot to locate the deflectors 53 over the coin-guide 41 and in the path of the coins to prevent a coin from entering the guide 41 when an empty column is in operation, but deflect the same into the carton delivery-pocket below.

The lower end of coin-guide 41 is contracted, and upright lugs 56 on my improved coin-holder 57 are pivoted thereagainst to give to the holder its necessary pivotal freedom. This holder 57 comprises two plates secured together by screws and spaced apart by enlargements, and a set-screw 58 in a depending arm 59 on guide 41 is adapted to exactly position said holder 57 above a segment 60, and a spring 61 holds the guide in such position and returns it thereto.

Between the plates of holder 57 and pivoted at one end to one of them is a coin-ejector 62, having a slot 63 in its lower free end in which is located a pin 64 on a bell-crank lever 65, pivoted to the outside of the holder, a slot 66 being provided therein in which the pin 64 moves. This lever 65 is connected by a rod 67 with one end of a bar 68, shaped as shown and pivoted to a fixed cylinder 69. This bar 68 has an inclined slot 70 therein, forming a cam-face against which a pin 71 on one side of a plunger 72 bears. This plunger 72 is mounted in the fixed cylinder 69, in which a coiled spring 74 is located to normally hold the plunger in one extreme position, and to the opposite end of the plunger one end of a ratchet-lever 75 is pivotally secured. The ratchet-lever 75 is pivoted between its ends and has a roller 76 at its free end bearing against the periphery of star-wheel 49, so that, it will be seen, when the storage-frame and star-wheel are turned the roller end of ratchet-lever 75 will move back and forth over the teeth or points of the star-wheel. This motion is communicated to plunger 72, and through the medium of pin 71 against the cam-face of slotted bar 68 causes longitudinal movement of rod 67 and pivotal movement of lever 65, which in turn swings the coin-ejector 62 to throw out any coin in holder 57. Hence if a purchaser, for instance, places a one-cent coin in the machine while the storage-frame is set to vend a one-cent article and he then attempts to turn the machine to a five or ten cent column the coin will be promptly thrown out by ejector 62 and returned to him in the delivery-pocket. This is also the case where a purchaser without intention to defraud changes his mind about the goods he desires after he has placed the coin in the machine. By turning the storage-frame he will have his coin returned, as above explained, and can purchase what he desires.

77 represents the operating-shaft horizontally mounted in front casing 35 and projecting through the same at one side, where it has a crank-arm 98 secured thereon to be turned by the purchaser to eject the goods he desires. The segment 60 above referred to is secured on this shaft 77 directly below coin-holder 57, which latter holds a coin in position on the segment in front of a shoulder 78. This shoulder is preferably formed by means of a detachable block, which can be conveniently replaced in the event of wear.

A pin 79 projects from one side of segment 60 and is engaged by the notched or hooked end of a pivoted locking-pawl 80, which prevents rotary movement of the segment 60 and shaft 77 until a coin is in position on the segment, when the holder 57 and segment 60, through the medium of its shoulder 78, are temporarily coupled together, so that a rotary movement of shaft 77 and segment 60 will move the holder pivotally far enough to compel a pin 81 on one edge of the pawl to swing locking-pawl 80 out of the path of pin 79 and permit a continued movement of the segment. The coin will jump the shoulder 78 and when the segment moves to its extreme position will drop down behind the same into a hopper 82 for directing the coins into a coin-receptacle 83 in the bottom of casing 1.

A disk 84 is secured upon shaft 77, and upon its face outwardly-projecting screws or pins 85 are located, two of said screws or pins being provided and spaced the proper distance apart. An arm 86 is loosely pivoted at one end on the shaft 77 between collars 87 and is disposed between the screws or pins 85 and moved thereby. The lower end of this arm 86 is connected by a pitman 88 with a sliding block or carriage 91, mounted to slide in a slotted guide-frame 89, secured to base-plate 3. To a lug 90 at one side of this block or carriage 91 the ejector 25 is pivoted and held in its inclined position by a coiled spring 93, located between the ejector and a shoulder 94 on the block or carriage.

When the shaft 77 is permitted to turn by the coin-controlled mechanism above explained, the first rotary motion is not communicated to arm 86, as the shaft turns partially before a screw or pin 85 engages the arm. This is to give the coin-controlled mechanism at segment 60 sufficient time to unlock the locking-pawl 80. The continued movement of shaft 77 swings arm 86 downward and forward to draw the carriage 91 and ejector 92 forward, compelling the latter to engage the lowest carton or box 95 and force it forward onto an inclined plane 96, down which it falls to the delivery-pocket. This delivery-pocket has a toothed guard 97 at its inner upper end to prevent the introduction of a hand or tool through the delivery-pocket to the interior of the machine. After the carton or box 95 falls into the delivery-pocket the operator releases the crank-arm 98, when a coiled spring 99, secured to one side of disk 84, returns the parts to their former positions.

To prevent a purchaser from turning the storage-frame after he has inserted a coin and started to turn the operating-shaft 77, I provide the disk 84 with a V-shaped notch 100 in its periphery, into which the angular end of a curved lever 101 is located when the parts are in their set position. The lever 101 is pivoted between its ends and connected at one end by a rod 102 with a catch-bar 103 hinged at one end. This catch-bar 103 is notched at one end, so that when it is raised its notched portion will be in front of ratchet-lever 75 and lock the same against pivotal movement, hence locking the star-wheel 49 and preventing the turning of the storage-frame. This upward and locking movement of catch-bar 103 is effected just as soon as disk 84 begins to turn, as one end of the lever 101 is forced out against the periphery of the disk, which movement elevates the other end of the lever and rod 102 to swing the catch-bar 103 to its locking position and maintain it in such position until the disk returns to its former position, so that the end of lever 101 can enter the V-shaped notch 100 therein. Another disk 104 is secured upon shaft 77 adjacent to the side wall of front casing 35 and made with three series of ratchet-teeth, with recesses 105 between them. A triangular pivoted dog 106, normally located in a recess 105, is adapted to engage the ratchet-teeth when the shaft is turned to compel a complete operation thereof before return. Against the upper face of this triangular dog 106 a spring-pressed plate 107 bears, said plate being secured upon a rod 108, mounted in a bracket 109, secured to front casing 35, and a coiled spring 110 is located on the rod between the bracket and plate to yieldingly hold the latter against the dog 106. When the disk 104 turns, its first function is to tilt the triangular dog 106, which movement is permitted by spring-pressed plate 107. The dog thus engages the ratchet-teeth in an inclined position, which will permit the turning of the disk in but the correct direction until the extreme of movement is reached, when the dog will be in another recess 105, and its inclination will change to permit the return of the disk and shaft to their former positions.

Figure 1:
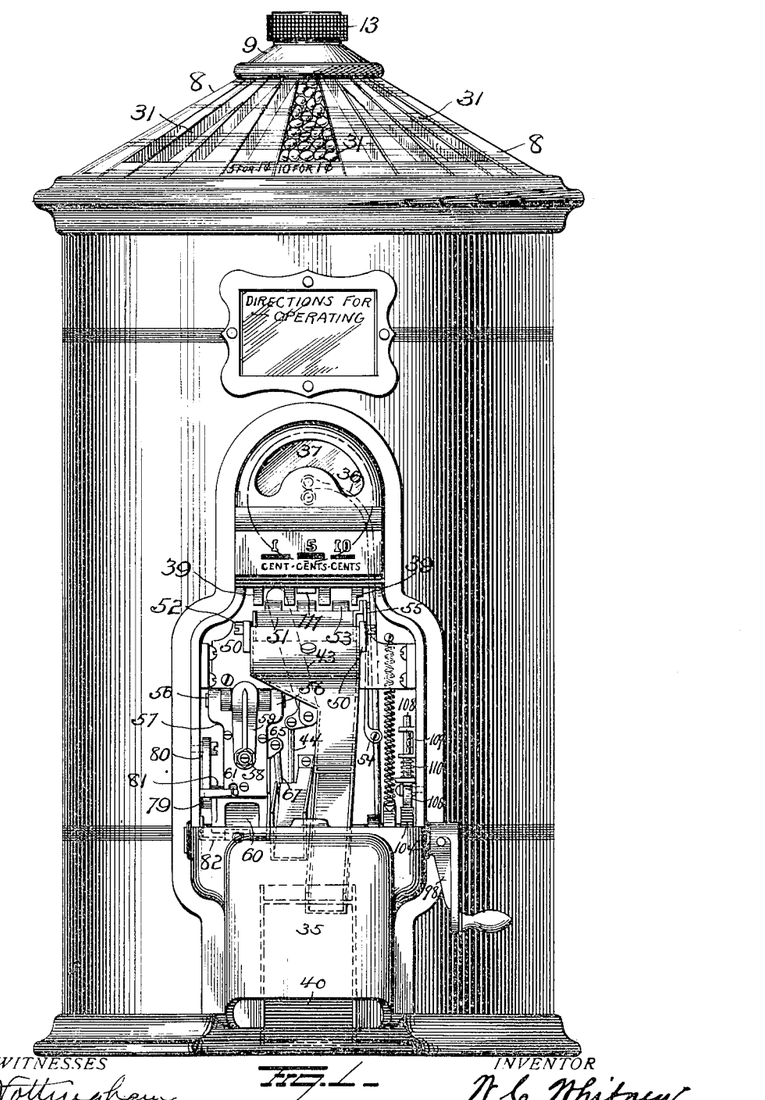
Figure 1 is a view in elevation, showing a portion of the front casing removed.
Figures 2, 19, 20:
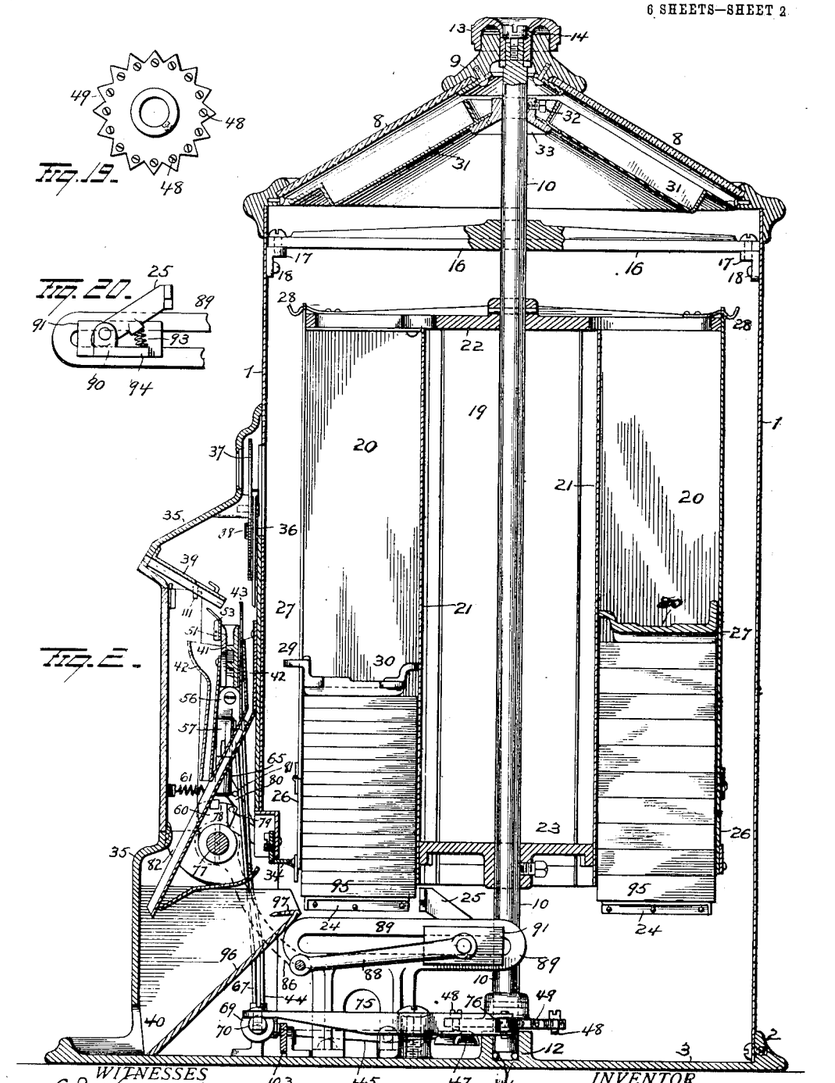
Figures 3, 11, 12, 13, 14:
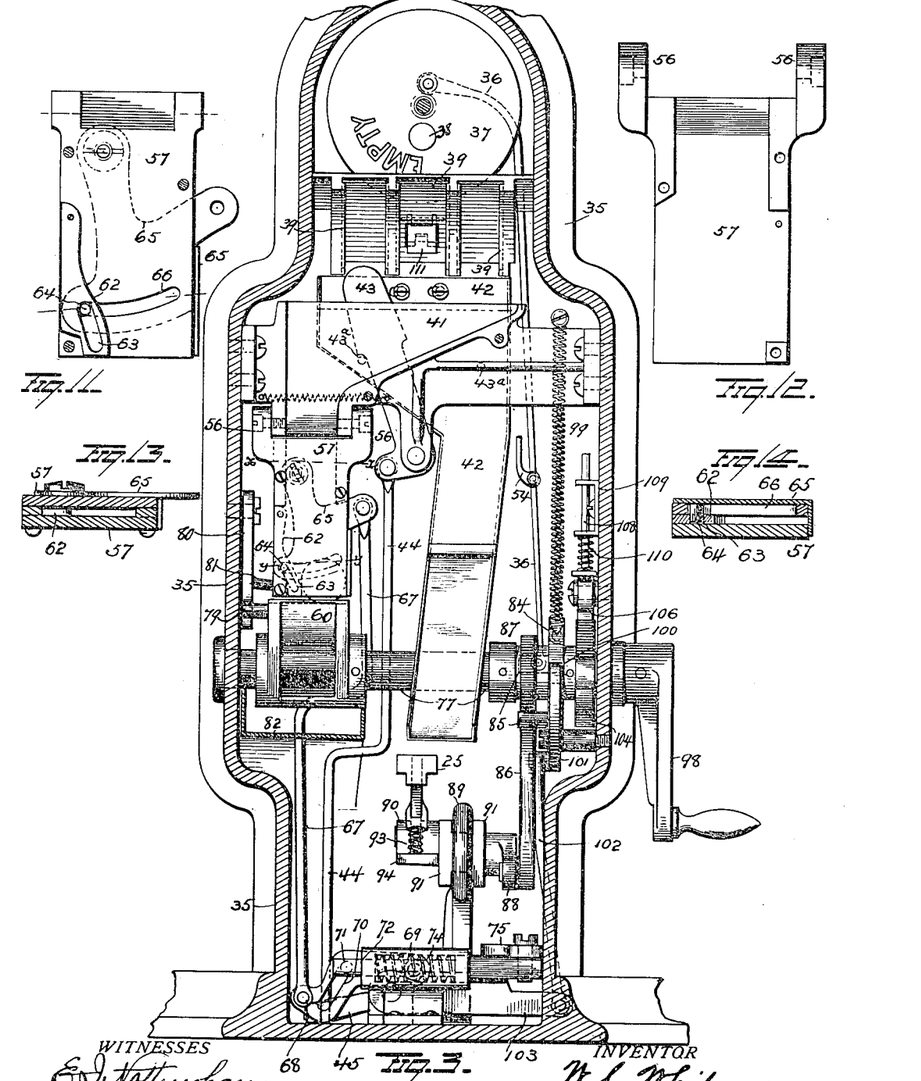
Fig. 3 is a front view of coin-controlling mechanism with certain parts removed.
Figs. 11, 12, 13, and 14 are detail views of the coin-holder 57.
Figure 4:
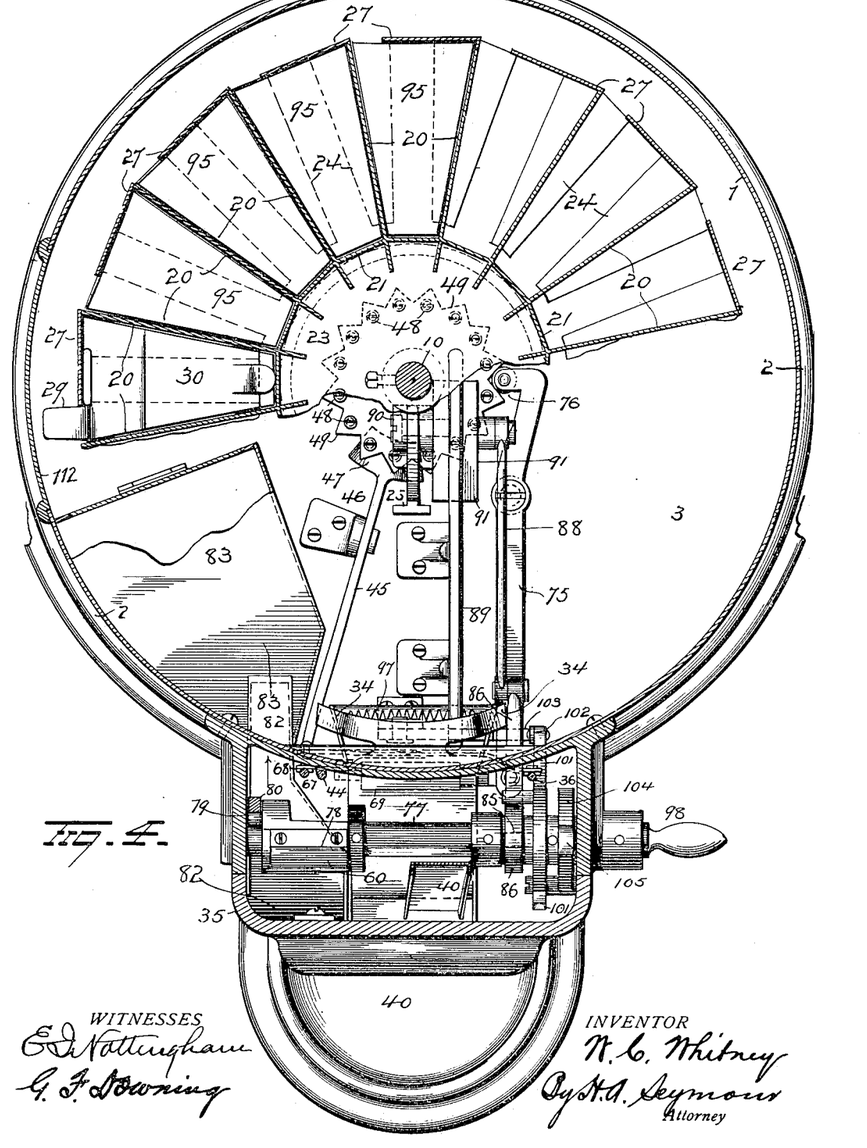
Fig. 4 is a view in horizontal section.
Figures 5, 6, 7, 8, 9, 10:
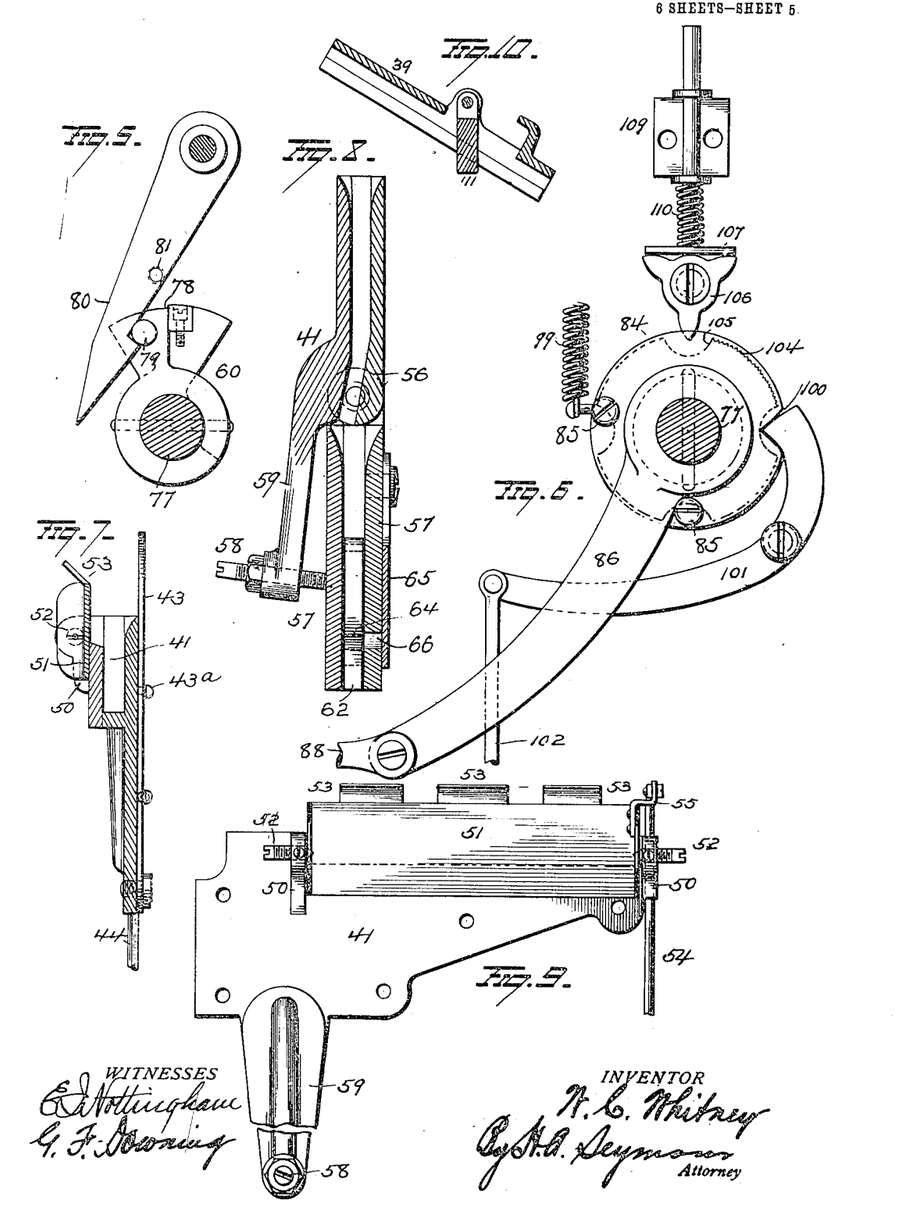
Fig. 5 is an enlarged view illustrating the segment-locking mechanism.
Fig. 6 is an enlarged view illustrating detailed construction of parts operated by the shaft 77.
Figs. 7, 8, and 9 are enlarged views of the coin-guide 41, holder 57, and parts carried thereby.
Fig. 10 is a view in section of the five-cent chute.
Figure 15:
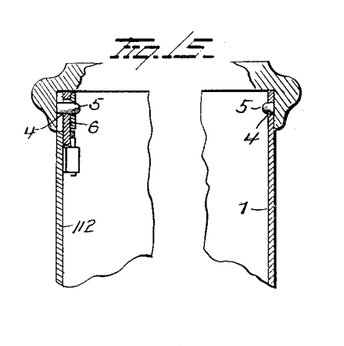
Figs. 15 and 16 are views illustrating the cover-securing mechanism.
Figure 16:
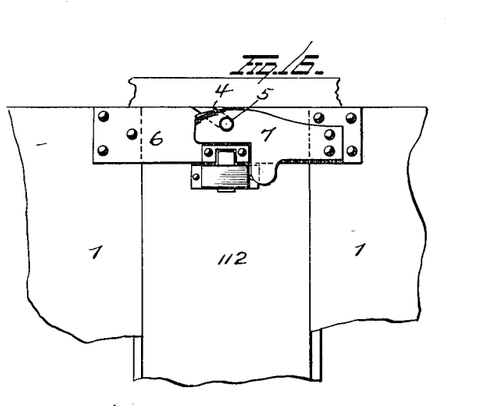
Figure 17:
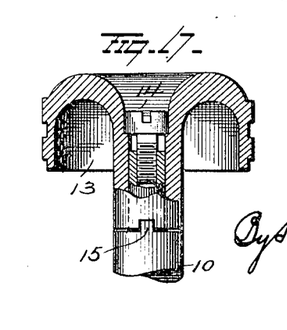
Fig. 17 is a view in section of the operating-knob.

By reference to Figs. 2, 3, and 10 it will be seen that a depending deflector 111 is hinged in the five-cent chute. This deflector 111 when a five-cent coin is placed in the chute will be swung up thereby and the coin pass into the coin-guide 41, and should a coin smaller than a five-cent piece be inserted in the five-cent chute it will fall through the open bottom thereof, as it is too narrow to reach to the ledges or grooves at the sides of the chute; but it has been found that if a one-cent coin be poised in the five-cent slot and given a sharp blow its momentum will be sufficient to carry it to the coin-guide 41, and to prevent this deflector 111 is located in the five-cent chute, against which a smaller coin will strike and be deflected into the delivery-pocket below.

A removable door 112 is provided in casing 1, through which access can be had to the storage-frame to fill the columns and to gain access to the cash-receptacle, and a section of front casing 35 is made removable to gain access to the coin-controller mechanism, both of said removable sections being securely locked in their closed positions, but capable of removal when the proper key is used.

The operation of my improvements is as follows: We will suppose the purchaser desires five-cent goods. He grasps knob 13 and turns the storage-frame until the proper column is at the front, ratchet-lever 75 serving to properly center the column. By so moving the storage-frame the screw 48 in star-wheel 49 will depress cam-plate 47 and compel the deflector 43 to move behind the five-cent chute, so as to deflect a five-cent coin into coin-guide 41, down which it falls onto the segment 60 and is supported in an upright position by the holder 57, which latter is coupled to the segment by the coin. Should coins be deposited in the other chutes, they would jump over guide 41 and fall into the delivery-pocket, and should a smaller coin be entered in the five-cent chute it will either fall from the chute or strike the deflector 111 and be ejected therefrom into the delivery-pocket below. With the segment 60 and holder 57 coupled together by the coin shaft 77 can be turned by crank-arm 98, the first movement being to force the holder 57 inward to move the locking-pawl 80 out of locked engagement with the segment, when the shaft 77 will be free to turn. The turning of shaft 77 through the medium of screws or pins 85 serves to draw arm 86 forward and pull the carriage 91 with the ejector 25 thereon forward. The ejector 25 engages the lowest carton or box and forces it out from the column into the delivery-pocket, and the coin falls from segment 60 down into the coin-receptacle. When arm 98 is released, spring 99 will return all the parts to the normal positions ready for the next purchaser. When a column is empty, the weight-finger 29 will engage cam-plate 34 and move disk 37 to designate the fact at the open window and will move the deflectors 53 in front of coin-guide 41 to deflect any into the delivery-pocket which may be inserted when an empty column is in operative position. If the storage-frame is moved after a coin has been inserted, the ejector 62 will be operated to throw out the coin and after the shaft has begun its movement the lever 101, through the medium of catch-bar 103, will lock the ratchet-lever 75 and prevent movement of the storage-frame. It will thus be seen that my improved machine is honest to itself and to the public, for it cannot cheat a purchaser nor can a purchaser cheat it.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a vending-machine, the combination with a rotary storage-frame containing columns of goods of different prices, of a series of coin-chutes for different coins, coin-controlled operating mechanism over which without obstruction a coin would jump and return to the purchaser, and a deflector common to all the coin-chutes and means operated by the frame to move said deflector behind the proper coin-chute and deflect the coin into the coin-controlled operating mechanism.

2. In a vending-machine, the combination with a rotary storage-frame containing columns of goods of different price, of a series of coin-chutes for different coins, coin-controlled operating mechanism over which a coin if unobstructed would jump and return to the purchaser, a deflector, a star-wheel movable with the storage-frame and means operated by the star-wheel to control the operation of the deflector to direct the proper coin into the coin-controlled mechanism.

3. In a vending-machine, the combination with a vertical shaft, and a storage-frame thereon comprising a series of columns or compartments for goods to be vended, of a star-wheel having a point or tooth for every column or compartment, a cam-plate, a coin-guiding deflector to direct the proper coin into operative position, and screws in the star-wheel to govern the operation of the cam-plate and deflector.

4. In a vending-machine, the combination with a casing, a vertical shaft therein, means for turning the same, a storage-frame on said shaft having a series of radial columns or compartments for goods of different price and a series of coin-entrance chutes for coins of different values, of a star-wheel on the shaft having a point or tooth for each compartment or column of the storage-frame and screw-threaded holes in said points or teeth, a cam-plate depressed varying distances by the screws in accordance with their length, and means operated by said cam-plate for permitting only the coin of proper value to pass to the coin-controlled mechanism.

5. In a vending-machine, the combination with a casing, a vertical shaft therein, means for turning the same, a storage-frame on said shaft having a series of radial columns or compartments for goods of different price, and a series of coin-entrance chutes for coins of different values, of a star-wheel on the shaft having a point or tooth for each compartment or column of the storage-frame and screw-threaded holes in said points or teeth, a cam-plate depressed varying distances by the screws in accordance with their length, a coin-guide to direct a coin to the coin-controlled mechanism for ejecting the goods and over which coins placed in the coin-chutes would jump and return to the purchaser if unobstructed, a deflector pivoted at one end and made in the form of a bell-crank lever, a rod connecting one member of said lever or deflector to the cam-plate to move the deflector behind the proper coin-chute to deflect the proper coin into the coin-guide and a spring to normally hold the deflector behind one chute.

6. In a vending-machine, the combination with a storage-frame, and coin-controlled mechanism to eject the goods therefrom, of a coin-chute to direct coins into said coin-controlled mechanism and having an open bottom through which smaller coins will fall, a pivoted or hinged deflector in said chute which will be displaced by the proper coin but deflect a smaller coin driven with force thereagainst, in an attempt to reach the coin-controlled mechanism, a second deflector, and means operated by the frame to move the same behind the coin-chute and deflect the coin into the coin-controlled operating mechanism.

7. In a vending-machine, the combination with a rotary storage-frame having a series of radial columns for goods and a weight on each pile of goods, of a coin-entrance chute, a deflector and means for effecting the operation of the deflector by the weight when a column is empty to deflect a coin back to the purchaser.

8. In a vending-machine, the combination with a rotary storage-frame having a series of radial columns for goods and a weight on each pile of goods, of a coin-entrance chute, a deflector, a cam-plate and a finger on each weight adapted when the column is empty to depress the cam-plate and move the deflector into position to throw out or return a coin placed in the chute, to the purchaser.

9. In a vending-machine, the combination with a rotary storage-frame containing columns or piles of goods to be vended and a weight on each pile of goods, of a series of coin-entrance chutes, a hinged plate having a series of deflectors thereon, a cam-plate, a rod connecting said cam-plate and deflector-plate, and fingers on the weights, which when the columns are empty are in a horizontal plane to engage the cam-plate and move all of the deflectors into the path of coins entering the chutes and deflect them out of operation and back to the purchaser.

10. In a vending-machine, the combination with a column of goods to be vended, of a coin-entrance chute, a coin-guide into which the coin falls, a coin-holder hinged to the coin-guide, an ejector-operating shaft, a segment thereon having a shoulder thereon in front of which the coin is held by the holder, a locking-pawl normally engaging a pin on the segment to lock the shaft, and a pin on the holder to engage and release the pawl when the shaft is turned and the holder and segment are coupled temporarily by a coin.

11. In a vending-machine, the combination with an ejector-operating shaft, a segment thereon normally locked, a holder to hold a coin on the segment which couples them together and an ejector within the holder for throwing a coin out of the holder and returning it to the purchaser.

12. In a vending-machine, the combination with a rotary storage-frame containing a series of columns of goods of different price, and coin-entrance chutes for coins of different value, of a coin-holder to hold a coin in position to permit the operation of the ejector mechanism, and a coin-ejector in said holder, adapted when the frame is turned, with a coin in the holder, to eject the coin and return it to the purchaser.

13. In a vending-machine, the combination with a rotary shaft, a storage-frame thereon containing goods in columns and of different price, of a star-wheel on said shaft, a ratchet-lever engaging the same, a coin-holder to hold a coin in operative position in the coin-controlled mechanism, and a coin-ejector operated by the ratchet-lever when the storage-frame and star-wheel are turned, to throw the coin out of operative position and return it to the purchaser.

14. In a vending-machine, the combination with a rotary shaft, a storage-frame thereon containing goods in columns and of different price, of a star-wheel on the shaft, a ratchet-lever engaging the star-wheel, a coin-holder to hold a coin in operative position in the coin-controlled operating mechanism, a coin-ejector in said holder, a lever connected therewith and adapted to move the same, a rod connecting said lever with a pivoted bar having a cam-slot therein, a plunger having a pin in said cam-slot, a housing or guide for said plunger, and a pivotal connection between the plunger and ratchet-lever.

15. In a vending-machine, the combination with a casing having a delivery-pocket therein, a rotary storage-frame for goods of different price, and means for ejecting the goods into the delivery-pocket, of a series of coin-entrance chutes for coins of different value, a single coin-guide, a hopper to direct misplaced coins into the delivery-pocket, a deflector, a star-wheel fixed to turn with the storage-frame, and interchangeable screws of various lengths in the star-wheel to move the deflector and direct only the proper coin into the coin-controlled operating mechanism.

In testimony whereof I have signed this specification in the presence of two subscribing witnesses.

WILLIAM C. WHITNEY.

Witnesses:
Joy Ten Eyck,
Wm. A. Smith.